Sept. 22, 1936.  C. B. MOREHOUSE  2,054,909
VALVE
Filed Nov. 5, 1934
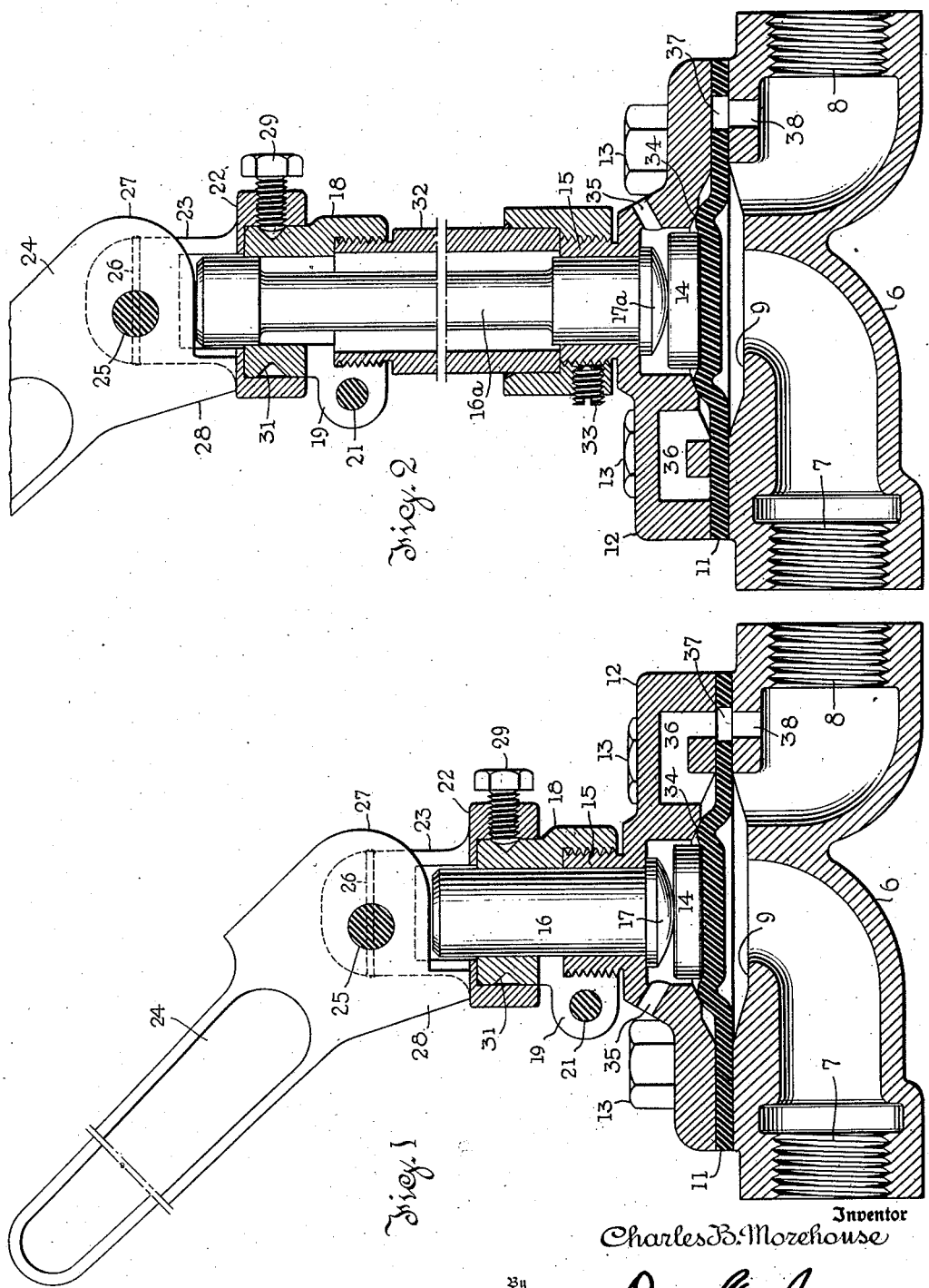
Inventor
Charles B. Morehouse
By
Attorneys Patented Sept. 22, 1936

2,054,909

UNITED STATES PATENT OFFICE 2,054,909

VALVE

Charles B. Morehouse, Watertown, N. Y., assignor to The New York Air Brake Company, a corporation of New Jersey Application November 5, 1934, Serial No. 751,629

4 Claims. (Cl. 251—24)

This invention relates to valves, and particularly to a device known as a diaphragm cock used in the air brake industry, and characterized by the fact that the closing member or valve element takes the form of a flexible diaphragm which is forced against an annular seat to close the passage through the valve or cock body. Such cocks seal tightly and have the advantage of quick opening and closing. They are highly satisfactory provided the sealing pressure is kept within reasonable limits. If it is not there is a tendency for the seat to cut the diaphragm.

The present invention provides an actuating mechanism including a cam moved by a swinging lever. Two adjustments are provided, one of which determines the maximum sealing pressure which can be exerted on the diaphragm through the cam and lever actuating mechanisms, and the other of which controls the position of the fulcrum member on which the actuating lever is mounted, the adjustment of such fulcrum member determining the plane in which the lever swings. The parts are so contrived that the pressure limiting adjustment can be made and locked, after which the second adjustment determining the plane in which the lever swings can be made at any time without risk of deranging the pressure adjustment, and when made can be locked.

Cocks of this description are commonly provided with a side vent, this being a vent passage leading from the discharge side of the valve and so arranged that it is sealed by the diaphragm when the latter is in position to open the passage through the valve, and is opened by the diaphragm when the latter is in position to close the passage through the valve. Inasmuch as the plane of operation of the handle is readily adjustable, it becomes possible to mount the bonnet on the valve body in different angular positions, and by forming the side vent passage partly in the body and partly in the bonnet, the selection of two assembly relations between the bonnet and the body may be availed of to render the side vent effective or ineffective as circumstances may demand. Thus a single mechanism may be assembled to afford a side vent control by the diaphragm, or to eliminate such side vent, at least so far as its effective operation is concerned.

Another feature of the invention is the possibility of substituting an extension neck and an extension push-rod in cases when it is desired to change the spacing of the actuating lever fulcrum from the body of the valve.

In the accompanying drawing:

Fig. 1 shows a complete valve without the extension neck and extension push-rod and with the body and bonnet assembled to afford a side vent. The view is in axial section.

Fig. 2 is a similar view showing the inclusion of the extension neck and the substitution of the extension push-rod for the normal push-rod, the bonnet and body being assembled to render the side vent ineffective.

Referring first to Fig. 1, 6 indicates the body of the valve which has an inlet or supply connection 7 and an outlet or discharge connection 8. Formed in the body is an annular seat 9 which controls communication from the inlet connection 7 to the discharge connection 8. A flexible diaphragm 11 is clamped against the upper face of the body 6 by means of a bonnet 12, said bonnet and body together forming a valve housing. The bonnet 12 is held to the body by equally spaced machine screws 13, four such screws being contemplated in the arrangement illustrated in the drawing. The diaphragm 11 may be of any suitable material but customarily takes the form indicated in the drawing. A molded rubber composition has been found highly satisfactory for these diaphragms but the particular material used is not a feature of the invention.

Resting on the upper face of the diaphragm and wholly confined by a recess formed in the bonnet 12 to receive and guide it is a thrust disk 14. The outside diameter of this disk approximates the outside diameter of the seat 9 so that when the disk 14 is forced downward, the diaphragm will be firmly pressed against the seat 9. Formed integrally with the bonnet 12 and centered above the seat 9 is a boss 15 which is threaded externally and which is bored to serve as a guideway for a plunger 16 having a convex lower head 17 resting directly on the disk 14.

Screwed on the external threads of boss 15 is a hub member 18 which is split or slotted longitudinally at one side as indicated at 19, and there provided with a clamping bolt 21 which may be set up to clamp the hub 18 tightly upon the threads of boss 15. Swiveled on the upper end of the hub 18 is a yoke member 22 having two spaced ears 23 upon which the actuating lever 24 is mounted. The mounting connection is made by a fulcrum pin 25 which passes through both ears 23 and through the lever 24. The pin 25 is held in position in the ears 23 by a stake 26 which passes through a hole drilled through one ear and the pin, the stake being riveted over at its ends. Lever 24 is provided with a cam surface 27 which co-acts with the upper end of the plunger 16, and serves to force the same downward when the lever is swung in clockwise direction (viewing the parts as shown in Fig. 1). A stop 28 which engages the member 22 defines the valve open or inactive position of the lever 24.

The yoke member 22 is clamped to hub 18 by means of a set screw 29 whose end engages an annular groove 31 encircling the upper portion of the hub 18. When the set screw 29 is released the member 22 may be rotated on the hub 18 to place the lever 24 in any desired plane, and when this adjustment has been effected the set screw 29 may be set up. To adjust the pressure which is exerted by lever 24 through cam 27, plunger 16 and disk 14 to hold the diaphragm 11 against the seat 9, the bolt 21 is released and the hub 18 is rotated, the effect being to raise or lower the hub according to the direction of such rotation, and thus determine the maximum downward motion of plunger 16 relatively to seat 9.

It will be observed that the adjustment of member 22 on hub 18 does not affect the vertical position of said hub, but that if hub 18 will be adjusted vertically on bonnet 12 it commonly will be necessary to release the screw 29 and turn the yoke member 22 to bring the lever 24 into the desired plane. In other words, the swiveling adjustment does not affect the vertical adjustment, but since the vertical adjustment is produced by rotating the hub 18, the vertical adjustment may destroy the swiveling adjustment which may then be corrected without affecting the vertical adjustment.

In Fig. 2 identical parts bear identical reference numerals. The plunger 16 with its head 17 is omitted and for this is substituted an elongated plunger member 16a having a head 17a. Except for its longitudinal dimensions it differs in no material respect from the plunger element which it displaces. The hub 18 is not screwed on the boss 15 but instead is threaded on the upper end of a tubular extension 32 whose lower end is threaded on the boss 15 and is locked on such boss by means of a set screw 33. The only effect of this arrangement is to space the fulcrum pin 25 farther from the seat 9 of the valve, an arrangement which is at times desirable because of manipulative requirements.

The structure so far described is completely operative but I prefer to include a side vent so arranged that it may be rendered effective or ineffective. To accomplish this the bonnet 12 is provided with an annular seat 34 engaged by a portion of the diaphragm outside the disk 14 when the diaphragm is in its uppermost position. The space within this seat is vented to atmosphere as indicated at 35. The space outside the seat 34 is connected with discharge passage 8 by means of a passage 36 in the bonnet, and through port 37 in the diaphragm and a passage 38 in the body 6.

If the parts be assembled as shown in Fig. 1, passages 36 and 38 communicate through the passage 37 but by removing the cap screws 13 and turning the bonnet 12 through a suitable angle with reference to body 6, here indicated as 180°, the passage 36 is brought out of register with port 37 and consequently is sealed against communication with passage 38. Consequently, so far as this side vent is concerned, Figs. 1 and 2 illustrate merely different assembly relations of body 6 and bonnet 12. In Fig. 1 the side vent is effective and in Fig. 2 ineffective.

It will be obvious from an inspection of Figs. 1 and 2 that a similar result could be secured by shifting the diaphragm alone, in which case an unperforated portion of the diaphragm would be interposed between the passages 36 and 38. Similarly, the bonnet and the diaphragm could be shifted together. As a rule, however, it is considered better to adopt the procedure shown in Fig. 2 for the reason that where a port is formed through a combined diaphragm and gasket as here shown, the sealing characteristics of the diaphragm around the port 37 are given special attention, so that it is considered advisable, though not strictly necessary, to adopt an arrangement in which the port 37 in the combined gasket and diaphragm is always in register with the port 38 in the body 6. By this means a perfect seal at this point is assured in a somewhat greater degree than would be assured if the other arrangements were adopted, though the other suggested arrangements are practicable and contemplated.

Referring to Fig. 1, when the lever 24 is swung clockwise to seat the diaphragm 11 against the valve seat 9 and close communication between the supply connection 7 and discharge connection 8, the discharge connection is vented to atmosphere by way of 38, 37, 36, and 35. However, in the open position of the cock as shown in Fig. 1, the pressure acting on the lower side of the diaphragm seals this against the seat 34, and the vent connection is completely closed.

With the parts assembled as shown in Fig. 2 the vent connection is blanked at all times.

While the arrangement illustrated in the drawing has demonstrated very practical utility and is preferred, minor variations can be made by the exercise of mechanical skill without departing from the spirit of the invention.

What is claimed is:—

1. A valve mechanism comprising in combination a two-part valve housing including a valve seat and inlet and discharge connections which communicate with each other through said seat; a flexible diaphragm valve clamped between the two parts of said housing and capable of being forced into sealing engagement with said seat to interrupt the communication therethrough; a lever; means forming an operating connection between said lever and said diaphragm valve; a yoke; means carried by said yoke and forming a fulcrum for said lever; a yoke supporting member interposed between said yoke and one part of said housing and having a swivel connection with one thereof and a threaded connection with the other thereof, the swivel connection permitting adjustment of the angle of the lever fulcrum, and the threaded connection permitting adjustment of the spacing of said fulcrum from said valve seat; and means for locking said threaded connection in adjusted positions.

2. A valve mechanism comprising in combination a two-part housing including a valve seat and inlet and discharge connections which communicate with each other through said seat; a flexible diaphragm valve clamped between the two parts of said housing and capable of being forced into sealing engagement with said seat to interrupt the communication therethrough; a lever; means forming an operating connection between said lever and said diaphragm valve; a yoke; means carried by said yoke and forming a fulcrum for said lever; a yoke supporting member interposed between said yoke and one part of said housing and having a swivel connection with one thereof and a threaded connection with the other thereof, the swivel connection permitting adjustment of the angle of the lever fulcrum, and the threaded connection permitting adjustment of the spacing of said fulcrum from said valve seat; means for locking said threaded connection in adjusted positions; and means for locking said swivel connection in adjusted positions.

3. The combination of a valve body having a seat and inlet and outlet connections communicating through said seat; a diaphragm adapted to close against said seat to isolate said connections from one another; a bonnet mounted on said body and serving with the body to sustain said diaphragm; a hub adjustably threaded on said bonnet; means for locking said hub in adjusted positions; a yoke having a swivel mounting on said hub; means for locking said yoke in angularly adjusted positions on said hub; a lever fulcrumed on said yoke; and a plunger guided in longitudinal movement within said hub and forming an operating connection between said lever and diaphragm.

4. The combination of a valve body and a valve bonnet having mating faces, said body having a valve seat and inlet and outlet connections communicating through said seat, there being a branch passage from said outlet connection terminating in the mating face of the body, said bonnet also having a valve seat and two passages, one passage being a vent and the other passage terminating on the mating face of the bonnet; a diaphragm clamped between said body and bonnet and adapted to seal alternatively against said valve seats; means carried by said bonnet for forcing said diaphragm against the valve seat in the body said means including a member rotatably mounted with reference to said bonnet on an axis substantially normal to the plane of said diaphragm, an actuating handle hinged to said member to swing in a plane which passes substantially through said axis, and means for locking said rotatable member in adjusted positions on said bonnet; and means for clamping said bonnet and body together in either of two alternative positions, in one of which positions the passages terminating in said mating faces communicate and in the other of which they are isolated from one another.

CHARLES B. MOREHOUSE.